Nov. 8, 1949    B. C. ROEHRL    2,487,479
FILM CARTRIDGE
Filed Feb. 15, 1946
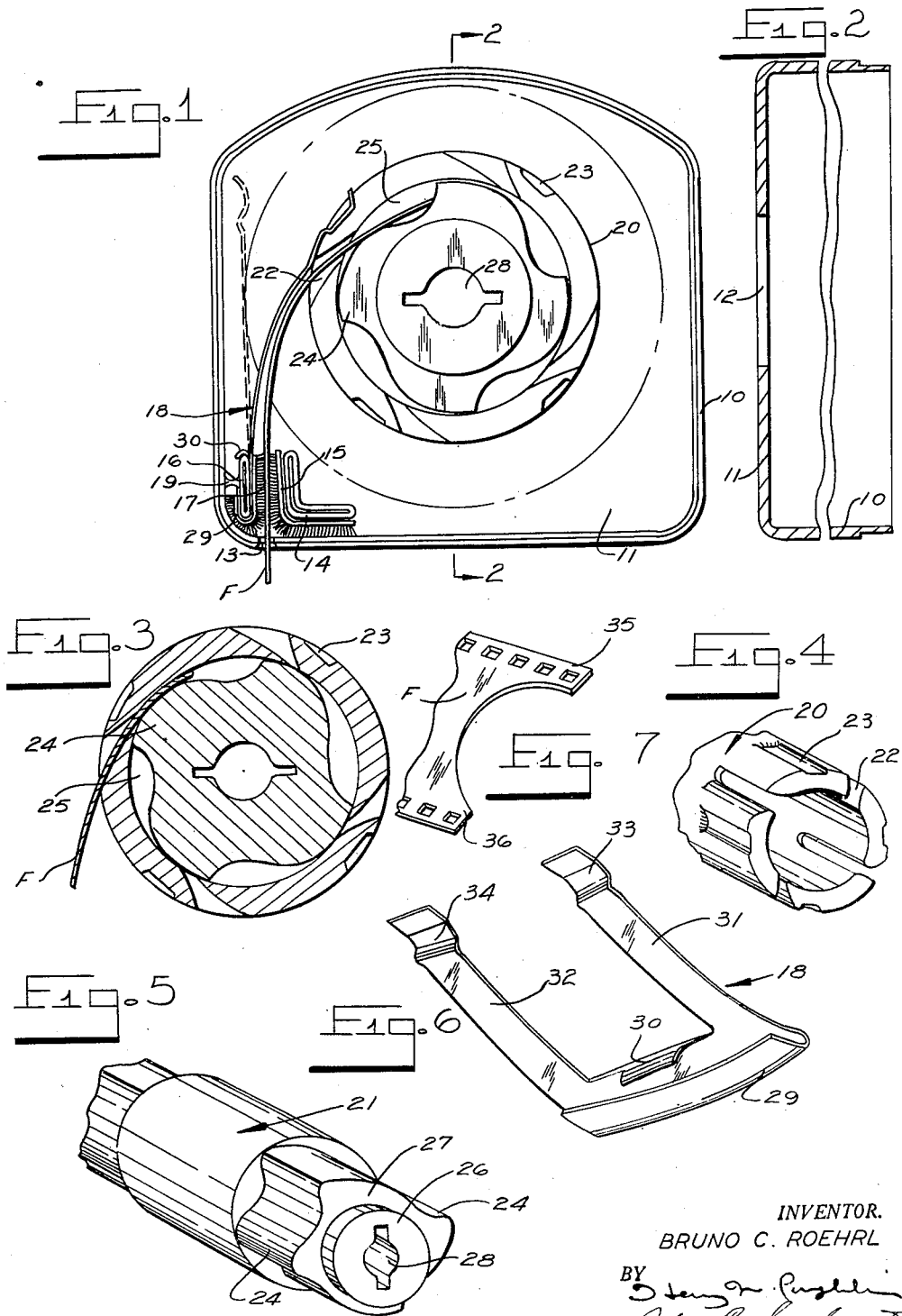
INVENTOR.
BRUNO C. ROEHRL
BY
ATTORNEYS Patented Nov. 8, 1949

2,487,479

UNITED STATES PATENT OFFICE 2,487,479

FILM CARTRIDGE

Bruno C. Roehrl, Erie, Pa., assignor to General Aniline & Film Corporation, New York, N. Y., a corporation of Delaware Application February 15, 1946, Serial No. 647,758

3 Claims. (Cl. 242—71)

This application pertains to film cartridges and more specifically to cartridges of a type adapted to receive the leading end of a film strip and to wind that strip into a roll or coil.

In that type of camera known as the "Memo" camera, exemplified in United States Patent 2,320,441, film is drawn from one light-tight cartridge and is pushed into a second and similar cartridge being coiled therein due to its own tendency to coil or roll, and to the accompanying influence of a spring. This system of film advancing is particularly desirable since, at no time, is the film handled when not in the light-tight cartridge, and it is not necessary to rewind the film into the original cartridge as must be done with some other systems.

It is an object of this invention to adapt the so-called "Memo" type cartridge to cameras in which advancing of the film from one exposure to the next is accomplished by a positive winding mechanism thereby making it unnecessary to rely upon the tendency of the film to curl or roll, or to rely upon special springs.

It is a further object of the invention to devise a cartridge adapted to receive the end of a film strip and, upon turning the usual winding knob or key in the camera, to grip that film end thereby to start the winding of the film on the spool.

It is a further object of the invention to devise a cartridge such that upon insertion of the end of the film strip that end will automatically be guided into the proper position within a specially-constructed spool whereupon it may be gripped as the winding for advancing the film is started.

It is a further object of the invention to devise a cartridge of the type which shall be light-tight, simple in construction, and adapted to be molded from plastic material thereby rendering the cost of production relatively cheap despite the fact that certain of the parts are peculiarly shaped and would not normally be produced by other method except at costs which might be prohibitive for an article to be sold with a roll of film and which is not adapted to be used over again for many times.

Other objects will become apparent as the disclosure proceeds.

According to the invention, a film cartridge is built up from molded plastic parts, although it is to be understood that the invention is by no means limited to parts fabricated in that manner but may be constructed of any suitable materials and by any process which lends itself. After a roll of film has been exposed, it is wound into the cartridge whereupon the camera may be opened and the cartridge removed after which the film may be removed from the cartridge in a dark room and processed.

The cartridge includes a shell or casing having end portions and a connecting tubular section which is preferably of somewhat rectangular shape although its shape may vary according to cameras in which it is to be employed and other factors. The shell may be constructed as herein described, in two parts joined at some intermediate point along the length thereof, or may comprise a tubular portion having end caps. A spool on which the film is to be wound is maintained in a more or less central position within the cartridge by engagement of circular end or bearing members which fit within corresponding openings in the ends of the casing. The spool is formed of two parts, an outer part tubular in form, and an inner part or core rotatable within the outer. Adjacent its ends, the outer tubular spool portion has a plurality of slots within which ends of the film may be inserted. The inner part or core of the spool member is molded to a special shape adjacent its ends and at a position to cooperate with the inner surface of the tubular part adjacent the said slots. At those end portions of the inner spool member are formed cam lobes having their outermost surfaces almost in contact with the inner surface of the tubular part. These serve to grip the inserted end or ends of the film as the inner portion or core is turned by a winding knob or key in the camera. A spring or similar member serves to guide the entering end of the film and also to retain the outer or tubular part of the spool in such position that the film cannot fail to enter one of the slots so that if pushed into position as far as it will go, winding of the spool must necessarily result in gripping the film. Thereupon it may be advanced and wound within the cartridge as the various exposures are made and to take up the end of the film so that it is entirely enclosed within the light-tight cartridge preparatory to being removed from the camera. The invention will be described in greater detail by reference to one particular embodiment thereof illustrated in the accompanying figures of drawing, in which:

Fig. 1 is an end view of the cartridge with a film inserted, one of the shell members having been removed thereby to show internal parts.

Fig. 2 is a section at line 2—2, Fig. 1, showing the case or shell member only.

Fig. 3 is a section taken through the spool showing the manner in which the end of a film strip is gripped.

Fig. 4 is an end view of the outer or tubular spool member.

Fig. 5 is an isometric view of the inner or core member of the spool.

Fig. 6 is a view of the retaining spring.

Fig. 7 shows one end of a film cut to facilitate its entry into the spool.

Now referring to Figs. 1 and 2, the cartridge includes two cooperating shell or casing members, one of which is indicated by numeral 10 and which may preferably be molded from any of the well-known plastics adapted to that purpose. According to one form the invention may take, the shell is comprised of two parts joined at a point along their length preferably at about the midpoint between the two end members 11. When assembled, the shell parts are retained in position by any satisfactory temporary sealing means, such as Scotch tape or photographic binding tape. If desired, the casing may be fabricated in other manners as by molding a tubular shell part at each end of which a separate cover is applied. In any event, the end members 11 are provided with a hole or opening 12 through which projects an end of the spool and by which the spool is maintained in position to be rotated in taking up film wound in the cartridge. In some instances, it may be sufficient to project only one end of the spool member through the casing thereby making it unnecessary to have an opening 12 at both ends of the cartridge.

The casing has a slot or opening 13 through which film may be drawn or into which it may be projected when loading and starting the film in a camera. The molded parts have projections, molded either as extensions of the end pieces 11, or of the tubular shell members 10, or both, and these projections serve to support parts of the cartridge presently to be described. The projections 14 which are preferably short extensions from the end pieces 11 support a light-excluding member 15 which is of plush material or any of the well-known materials for that purpose. Likewise, the projections 16 support similar light-excluding material 17 and also a spring 18 shown in detail in Fig. 6. As herein illustrated, each molded extension 16 is further supported and strengthened by a strut 19.

Referring to Figs. 1, 3, 4 and 5, the spool by which the film is gripped and upon which it is wound comprises an outer tubular member 20 and an inner or core member 21. The outer tubular member has a plurality of slots 22 adjacent its ends. These slots, as better illustrated in Figs. 1 and 3, incline at about 45° to a radius passing through them and are rounded and otherwise shaped especially for the reception of ends of the film strip as it is pushed into the cartridge after inserting it at the film slot 13. It is also guided by the spring 18. Here, there are four slots 22 at either end of the tubular member 20, but it is to be understood that any satisfactory member may be employed. A corresponding number of notches spaced between the slots 22 serve, with the spring 18, to stop the spool in proper position so that the slots 22 are precisely positioned for the reception of the film.

The core 21 has a central portion which is a working fit within the inner surface of tubular part 20, it being understood that these parts need not be machined in any manner since the tolerances obtainable in casting are sufficient for the purpose. A few thousandths clearance at the various working points will not adversely affect the operation of the spool and will assure that the molded parts may be easily assembled and that they will function as intended when assembled.

At the ends of the core member and underlying the slots 22, a plurality of cam lobes 24, equal in number to the number of slots, are of such shape as to provide a space 25 into which the end of the film may be inserted as illustrated in Fig. 1. These cam lobes have a radius gradually increasing until at the points of the cams, the clearance between them and the inner surface of the tube 20 is less than the thickness of the thinnest film to be received. Thus, as the core 21 is rotated in a clockwise direction from the position shown in Fig. 1, the surface of the cam lobe will eventually contact the film, push it against the inner surface of the tube 20, thereby binding or gripping it in such manner that as the winding knob or key of the camera is turned, the two parts 20 and 21 thereafter turn as a unit winding the film upon the outer surface of core member 20.

The ends 26 of core member 21 are of reduced diameter to fit into the openings 12, the clearance being such that in combination with the adjacent shoulder 27, formed by the portion at which the cam lobes are molded, they provide an effective light seal. At the appropriate end of the core member, a conventional key slot 28 is formed.

The spring indicated by numeral 18 is retained in position by the bent end 29 which engages beneath the projections 16 and a clip 30 which is oppositely bent at the other edge of said projection. The spring has two projecting parts 31 and 32 which are bent as indicated adjacent their ends to form latches 33 and 34 for engagement with the notches 23. When the cartridge is assembled, the tubular spool member 20 is positioned so that the spring will engage notches 23 as shown in Fig. 1. The extensions 31 and 32 then serve as continuous guiding members for the film as it is pushed into the cartridge. As the film roll builds up to a maximum diameter as indicated by the dot-and-dash line, Fig. 1, the spring gradually bends outwardly finally reaching the dotted line position. After the initial gripping and start of the winding has commenced, there is no further need for contact between the spring and the spool.

According to the form of the invention shown, the slots 22 extend inwardly for a short distance from the ends of part 20. It is conceivable that a single slot extending the length of the spool might be employed, it always being positioned for the entry of the film, and in that event, the end of the film strip may be inserted and engaged by a longer cam member. By employment of a sufficient number of slots and cam lobes, it becomes practically impossible to so position the core member that the film cannot be inserted. However, it is necessary to cut the end of the film. As illustrated in Fig. 7, a film designated by letter F has been cut so that ends 35 and 36 will enter the slots 22 for a distance approximating that illustrated in Fig. 1. Since the spring members 31 and 32 function only at the edges of the film, they do not engage any part thereof within the picture area. In Fig. 7, a perforated film has been shown, but it is to be understood that the invention is by no means limited to film of that type, but may be employed with all films which may be classified as roll film.

While the central portion of the core 21 has been shown as circular in cross-section, the entire core may be molded to have the flutes or cam lobes extending throughout its length in which event the bearing between the two members would be of less extent, but, however, sufficient for the purpose. Modifications in the shape of parts, the number of slots, lobes and notches may be varied, and other changes made without departing from the general inventive concept. Depending upon the camera in which the cartridge is to be employed, the shape and proper proportion of parts may be varied throughout a wide extent.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. A film cartridge adapted to receive the leading end of a film strip and to wind the said strip therein, having in combination, a shell with a film slot at one side thereof and openings at either end, a winding spool having reduced end portions for engagement within the end openings of the shell, said spool comprising two parts, the outer one of said parts being formed as a tube having a plurality of slots adjacent either end, and the inner member of said two-part spool being rotatable within the said tubular member and having at either end underlying the slotted portion of the tubular member, a plurality of cam lobes adapted when the said inner member is rotated after insertion of a film end through one of said slots, to clamp that film end thereby retaining the film and causing the two-part spool to be rotated as a unit, and means for positioning the said tubular spool member to receive the leading end of film inserted in the cartridge and for guiding the said film into one of the slots.

2. A film cartridge adapted to receive the leading end of a film strip and to wind the said strip therein having in combination, a shell with a film slot at one side thereof and openings at either end, a winding spool having reduced end portions for engagement within the end openings of the shell, said spool comprising two parts including an outer tubular member and an inner rotatable part, slots adjacent either end of said tubular member, and notches between the said slots and at the outer surface of the said tubular member, the inner portion of the two-part spool comprising a central cylindrical bearing, end portions having cam lobes, and a key slot at one reduced end thereof, a spring member fixed to the shell and having its free ends so formed as to engage within the notches in the tubular part of the spool thereby to hold certain of the slots therein in a position to receive the leading end of an inserted film strip, said spring member being further adapted to guide said leading edge of the film strip into the slots in the tubular spool member.

3. A film cartridge adapted to receive the leading end of a film strip and to wind the said strip therein, having in combination, a shell with a film slot at one side thereof and an opening at at least one end, a winding spool having a reduced end portion for engagement within the end opening of the shell, said spool comprising two portions, the outer one of said portions being formed as a tube having at least, one slot adjacent either end thereof, and the inner member of said two-part spool being rotatable within the said tubular member and having at either end underlying and in alignment with the slotted portion of the tubular member a cam lobe adapted when the said inner member is rotated after insertion of a film end through the slots at the ends of the tubular members, to clamp that film thereby retaining the film and causing the two-part spool thereafter to be rotated as a unit when the inner member is turned, and a detent fixed to said shell and having projecting free ends engageable with the said tubular member for positioning it to receive the leading end of a film strip inserted in the cartridge and for guiding the said film into the slots in said tubular member.

BRUNO C. ROEHRL.

REFERENCES CITED

The following references are of record in the file of this patent:

UNITED STATES PATENTS

| Number | Name | Date |
| --- | --- | --- |
| 535,974 | Allis | Mar. 19, 1895 |
| 1,313,454 | Beidler | Aug. 19, 1919 |
| 1,448,125 | Kiracofe | Mar. 13, 1923 |
| 2,019,672 | Goodhand | Nov. 5, 1935 |
| 2,237,737 | Houston | Apr. 8, 1941 |
| 2,390,894 | Morse | Dec. 11, 1945 |

FOREIGN PATENTS

| Number | Country | Date |
| --- | --- | --- |
| 503,552 | Great Britain | Apr. 11, 1939 |